Patented Oct. 21, 1930

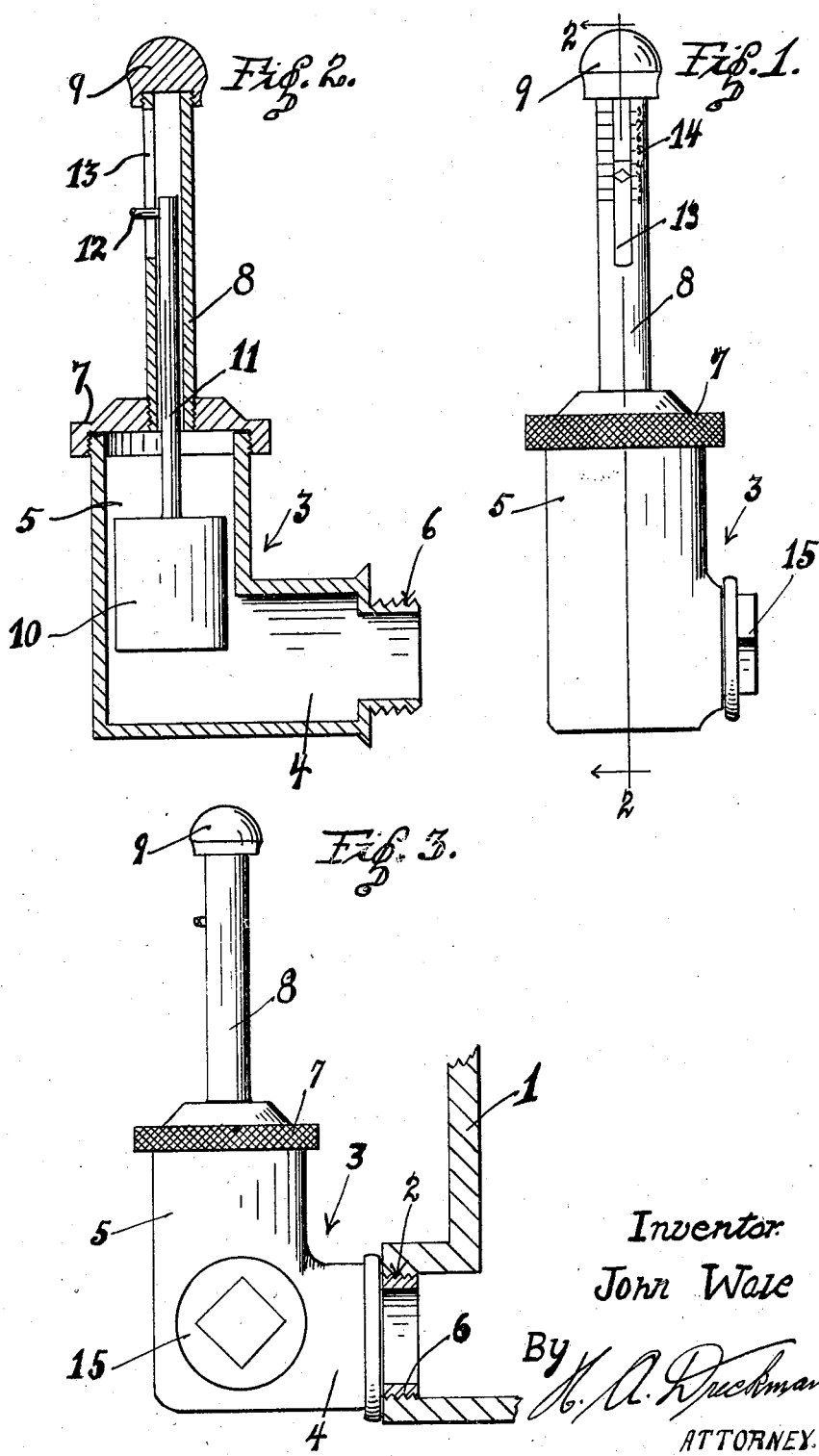

1,778,840

UNITED STATES PATENT OFFICE

JOHN WALE, OF LONG BEACH, CALIFORNIA

OIL-LEVEL INDICATOR

Application filed February 20, 1928. Serial No. 255,535.

This invention relates to an oil indicator for motor vehicles which is adapted to be screwed into the crank case below the oil level therein, and a float in the indicator rests on the oil indicating through a movable rod the height of the oil in the crank case.

An object of my invention is to provide an indicator which is adapted to be mounted in place of a plug in the side of the crank case.

Another object is to provide an oil indicator which is simple in construction and which is effective in operation.

Other objects, advantages, and features of invention may appear in the accompanying drawing, the subjoined detailed descriptions, and the appended claim.

In the drawing—

Fig. 1, is an end elevation of my indicator.
Fig. 2, is a sectional view taken on line 2—2, Fig. 1.
Fig. 3, is a side elevation of my oil indicator with parts shown in section.

Referring more particularly to the drawing, the numeral 1, indicates the crank case of an engine which crank case is provided with a tapped opening 2, in which my indicator is adapted to be mounted. My indicator comprises a substantially L-shaped body 3, which includes a horizontal chamber 4, and a vertical chamber 5. A threaded extension 6, is provided extending from the chamber 4, which extension screws into the tapped opening 2, thus the fluid in the crank case 1, flows into the chambers 4, 5, to the same level as in the crank case.

A cap 7, screws onto the top of the body 3, over the chamber 5, and a tube 8, screws into the cap 7. The tube 8, is closed at the top thereof, by a head 9, which screws onto the top of the tube.

A float 10 is mounted in the vertical chamber 5, and is but slightly smaller than the diameter of the chamber, so that it is accurately guided in its movement up and down into the chamber.

A stem 11, rises from the float and is secured thereto, said stem extending into the tube 8. An indicator pin 12 is carried by the stem 11 at its upper end and extends into a slot 13 in tube 8 to indicate the level of the oil in the crank case.

A scale 14, is provided on the tube 8, adjacent the slot 13 so that the exact amount of oil in the crank case can be determined. For draining purposes I provide a plug 15, in the side of the body 3. There is an advantage in providing the plug in the side of the body in that the indicator will not be loosened in the opening 2, when the plug 15, is unscrewed.

I have found my indicator of particular advantage in connection with the Packard motor car, to which it is particularly adapted. If desired, a tube 8, may be extended any desired amount so that it will reach up to the dash in which event the stem 11 is also lengthened, a corresponding amount and the indicating pin 12 will also appear on the dash.

Having described my invention, I claim:

An oil indicator for vehicle engines comprising an integrally cast L-shaped body, a threaded extension integrally formed on one end of said body and adapted to screw into the crank case of an engine, said body providing a horizontal chamber and a vertical chamber therein, a cap mounted on the other end of the body over the vertical chamber, a tube mounted in the cap and rising therefrom, a head mounted on the top of the tube, a float in the vertical chamber, which float is guided in said chamber by walls thereof, a stem rising from the float into the tube, said tube having a vertical slot therein, and a pin projecting from the stem through the slot, and a drain plug removably mounted in the side of the body and communicating with the horizontal chamber therein.

In testimony whereof, I affix my signature.

JOHN WALE.